March 9, 1954   A. SNIJDERS   2,671,823
ARRANGEMENT FOR CLEARING SIGNALS IN TELEGRAPH SYSTEMS
Filed June 28, 1950

INVENTOR
ANTONIE SNIJDERS
BY
Michael S. Striker
agt.

Patented Mar. 9, 1954

2,671,823

UNITED STATES PATENT OFFICE 2,671,823

ARRANGEMENT FOR CLEARING SIGNALS IN TELEGRAPH SYSTEMS

Antonie Snijders, The Hague, Netherlands

Application June 28, 1950, Serial No. 170,775

6 Claims. (Cl. 178—69)

The invention relates to an arrangement with which an accurately determined operating time of a relay can be obtained and in particular to an arrangement for clearing signals in telegraph systems.

Such an arrangement is disclosed in U. S. Patent 2,554,596 which was filed on December 17, 1947 and is titled "Supervision Circuit for Telegraph Systems." The arrangement disclosed in this patent has the disadvantage that a rapid charging of the condenser of the R. C.-circuit, which determines the time constant, requires a separate diode as well as a voltage divider network across the battery terminals. The arrangement according to the invention avoids these disadvantages by providing a charging circuit, in which the condenser is connected between the armature to be supervised and the control grid of the supervisory tube. The cathode of the supervisory tube is connected to the negative pole of the battery and the anode of the tube is connected via the operating winding of a supervisory relay to the positive pole of the battery. The resistance forming part of the time delay network is connected between the positive pole of the battery and the side of the condenser which is not connected to the armature. The supervisory tube is in its conductive condition when the armature is in its normal position as well as when the armature has been in the operating position for a lapse of time determined by the R. C. time constant, the relay being energized only when the armature is in the last mentioned position and the supervisory tube is in its conductive condition at the same time.

This arrangement has the advantage that it can be performed with a minimum of normal switching apparatus.

The invention will be explained by means of figures showing some of the possible embodiments.

Figure 1:
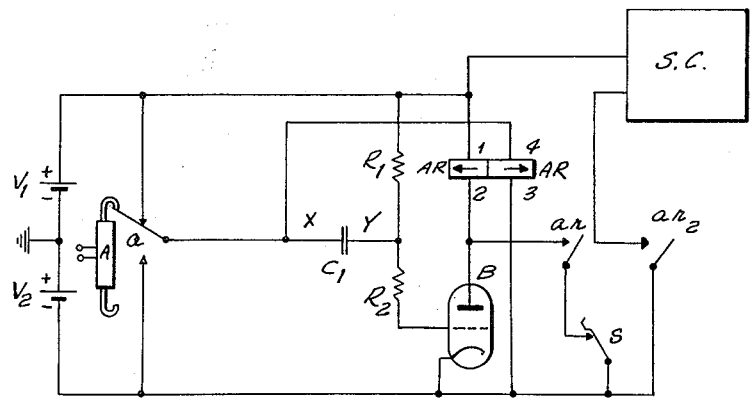
Fig. 1 shows a supervisory arrangement containing a supervisory relay having two differentially connected windings.

The armature $a$ of the polarized relay A to be supervised is illustrated in Fig. 1, which e. g. can be the armature of a telegraph relay. The armature $a$ is supervised by an arrangement consisting of tube B, relay AR, condenser $C_1$ and resistance $R_1$. This arrangement becomes operative after a prescribed time period, determined by the values of condenser $C_1$ and resistance $R_1$, during which time the armature has been in contact with the contact connected to the negative pole of the battery. When the armature is in contact with the contact connected to the positive pole of the battery, the supervisory process starts again from the beginning.

When no signals energize relay A the armature $a$ is connected to the positive pole of the battery. The winding 4—3 of the relay AR, when the armature is connected to the positive pole of the battery, carries current due to the diode action of the control grid and cathode of tube B. The condenser, in this condition, is charged to a voltage which is substantially equal to the voltage $$\frac{R_1}{R_1+R_2}(V_1+V_2)$$

In this condition tube B is conductive, so that also winding 1—2 of relay AR, which is connected differentially with the first mentioned winding, carries current. Therefore the relay cannot attract its armature.

If the armature $a$ is switched over to the contact connected to the negative pole of the battery, the voltage at the control grid of tube B becomes negative relative to the cathode by about the full battery voltage $V_1+V_2$, which voltage diminishes gradually due to the discharging process via resistance $R_1$. At the same time the current flow in winding 4—3 of relay AR has stopped due to the short-circuiting of winding 4—3 by armature $a$. Winding 1—2 is not energized since tube B is non-conductive. Consequently supervisory relay AR cannot attract its armature.

After a lapse of time, determined by the values of resistance $R_1$ and condenser $C_1$, the condenser is discharged to a voltage level rendering tube B conductive again. Now only winding 1—2 of relay AR is energized. Relay AR attracts its armatures now. If necessary a circuit for a holding winding may be closed, the energizing winding being capable of acting as such, as indicated in the figure, by means of contact $ar_1$.

When the armature $a$ returns to the contact connected to the positive pole of the battery, condenser $C_1$ is rapidly charged via the diode action of control grid and cathode of tube B.

The resistance $R_2$ is selected to maintain the charging current within the operating limits of the tube. From an electrical point of view the arrangement, when armature $a$ is connected to the positive pole of the battery, is again in the initial condition. The holding circuit including contact $ar_1$ may be interrupted by actuating switch S.

Contact $ar_2$ is also actuated when only winding 1—2 of relay AR is energized. Contact $ar_2$ actuates a monitor or supervisory circuit SC. The supervisory circuit can serve for any convenient purpose which has no relation to the invention proper. For example the supervisory circuit SC may start a visual and/or audible alarm (not shown), call a receiver for special messages (e. g. time signals transmitted in five-unit code), give a closing signal, etc.

Figure 2:
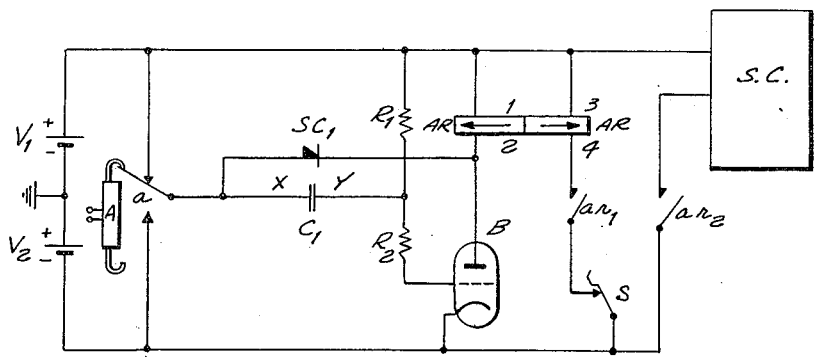
Fig. 2 is a modification of Figure 1 and illustrates a supervisory relay having one operating winding and a holding winding.

Fig. 2 shows a modification of the arrangement according to Fig. 1. In Figure 1 a countermagnetizing effect was employed to prevent the supervisory relay from attracting its armature when the supervisory tube was conductive and the armature $a$ was still in its normal position (positive pole). Instead of using a countermagnetizing effect a similar end result may be obtained by means of a short-circuit. The second winding 4—3 of the relay AR is used as holding winding in the short circuit arrangement. A rectifier $SC_1$ is connected between armature $a$ and the anode of the supervisory tube B. The direction of conductivity of this rectifier is chosen so that it forms a short-circuit across the winding 1—2 of relay AR when the armature $a$ is in contact with the contact connected to the positive pole of the battery.

The use of the arrangement in which the rectifier $SC_1$ is introduced results in the advantage that the condenser-charging diode disclosed in U. S. patent application S. N. 792,246 now U. S. Patent 2,554,596, may be omitted. For proper functioning of a charging diode, the application of a diode which insures a sufficiently high resistance in its blocked condition, is required. Rectifiers of any kind do not fulfill this function satisfactorily as these rectifiers though having perhaps a sufficiently high resistance in their blocked condition, also have a high resistance in their conducting condition so that the condenser $C_1$ cannot be charged rapidly enough. The function of the rectifier $SC_1$ can be fulfilled by usual rectifiers exhibiting known normal characteristics.

The supervisory circuit is used and connected in the same manner outlined with reference to Fig. 1.

While I have illustrated and described what I regard to be the preferred embodiment of my invention, nevertheless it will be understood that such is merely exemplary and that numerous modifications and rearrangements may be made therein without departing from the essence of the invention, I claim.

1. An arrangement for clearing signalling in a telegraph system, comprising in combination, a direct potential source having a positive terminal and a negative terminal; an armature of a telegraph relay, said armature being connected normally to said positive terminal of said source, said armature being temporarily disconnected therefrom and connected to said negative terminal of said source; a condenser connected to said armature; a resistor inserted between the opposite terminal of said condenser and said positive terminal of said source; a tube having a cathode, a grid, and an anode, said cathode being connected to said negative terminal of said source, said grid being connected to the junction of said condenser and said resistor so as to render said tube conductive when said armature is connected to said positive terminal of said source, thereby charging said condenser through the grid-cathode space of said tube acting as a diode, and to render said tube non-conductive for a predetermined period of time determined by the magnitudes of said condenser and said resistor, when said armature is connected to said negative terminal of said source; a relay connected between said anode of said tube and said positive terminal of said source; means for rendering said relay inoperative when said armature is connected to said positive terminal of said source and said tube is conductive; and means for rendering said relay inoperative when said armature is connected to said negative terminal of said source and said tube is non-conductive, whereby said relay is rendered operative when the predetermined time has elapsed from the moment in which said armature is connected to said negative terminal of said source.

2. An arrangement for clearing signalling in a telegraph system, comprising in combination, a direct potential source having a positive terminal and a negative terminal; an armature of a telegraph relay, said armature being connected normally to said positive terminal of said source, said armature being temporarily disconnected therefrom and connected to said negative terminal of said source; a condenser connected to said armature; a resistor inserted between the opposite terminal of said condenser and said positive terminal of said source; a tube having a cathode, a grid, and an anode, said cathode being connected to said negative terminal of said source, said grid being connected to the junction of said condenser and said resistor so as to render said tube conductive when said armature is connected to said positive terminal of said source, thereby charging said condenser through the grid-cathode space of said tube acting as a diode, and to render said tube non-conductive for a predetermined period of time determined by the magnitudes of said condenser and said resistor, when said armature is connected to said negative terminal of said source; a relay having a first and a second winding, said first winding being inserted between said anode of said tube and said positive terminal of said source, said second winding opposing said first winding and being inserted between said negative terminal of said source and the junction of said armature and said condenser, whereby, when said armature is connected to said positive terminal of said source, said tube is conductive and said first winding and said second winding thereof are energized so that said relay is not operated, whereas, when said armature is connected to said negative terminal of said source, said second winding is short-circuited and said first winding is de-energized for the predetermined period of time so that said relay is not operated, said relay being operated after the lapse of the pre-determined period of time by said tube becoming conductive and energizing said first winding of said relay, said second winding being short-circuited.

3. An arrangement for clearing signalling in a telegraph system, comprising in combination, a direct potential source having a positive terminal and a negative terminal; an armature of a telegraph relay, said armature being connected normally to said positive terminal of said source, said armature being temporarily disconnected therefrom and connected to said negative terminal of said source; a condenser connected to said armature; a resistor inserted between the opposite terminal of said condenser and said positive terminal of said source; a tube having a cathode, a grid, and an anode, said cathode being connected to said negative terminal of said source, said grid being connected to the junction of said condenser and said resistor so as to render said tube conductive when said armature is connected to said positive terminal of said source, thereby charging said condenser through the grid-cathode space of said tube acting as a diode, and to render said tube non-conductive for a predetermined period of time determined by the magnitudes of said condenser and said resistor, when said armature is connected to said negative terminal of said source; a relay having a first and a second winding, said first winding being inserted between said anode of said tube and said positive terminal of said source; a contact controlled by said relay and being connected in series with said second winding between said positive terminal and said negative terminal of said source, said second winding serving as a holding winding for said relay; and a rectifier inserted between the junction of said armature and said condenser and the junction of said anode of said tube and said first winding of said relay, said rectifier short-circuiting said first winding when said armature is connected to said positive terminal of said source, whereby when said armature is connected to said positive terminal of said source said first winding and said second winding of said relay are de-energized so that said relay does not operate, whereas, when said armature is connected to said negative terminal of said source said tube is rendered non-conductive for the predetermined period of time so that said first winding and said second winding of said relay are de-energized and said relay does not operate, whereas after the lapse of the predetermined period of time said tube becomes conductive and said first winding of said relay is energized so as to operate the same, so that said contact of said relay is closed and said second winding is energized and holds said relay.

4. An arrangement for clearing signalling in a telegraph system, comprising in combination, a direct potential source having a positive terminal and a negative terminal; an armature of a telegraph relay, said armature being connected normally to said positive terminal of said source, said armature being temporarily disconnected therefrom and connected to said negative terminal of said source; a condenser connected to said armature; a first resistor inserted between the opposite terminal of said condenser and said positive terminal of said source; a tube having a cathode, a grid, and an anode, said cathode being connected to said negative terminal of said source; a second resistor being connected between said grid and the junction of said condenser and said first resistor so as to render said tube conductive when said armature is connected to said positive terminal of said source, thereby charging said condenser through the grid-cathode space of said tube acting as a diode, and to render said tube non-conductive for a predetermined period of time determined by the magnitudes of said condenser and said first resistor, when said armature is connected to said negative terminal of said source; a relay connected between said anode of said tube and said positive terminal of said source; means for rendering said relay inoperative when said armature is connected to said positive terminal of said source and said tube is conductive; and means for rendering said relay inoperative when said armature is connected to said negative terminal of said source and said tube is non-conductive, whereby said relay is rendered operative when the predetermined time has elapsed from the moment in which said armature is connected to said negative terminal of said source.

5. An arrangement for clearing signalling in a telegraph system, comprising in combination, a direct potential source having a positive terminal and a negative terminal; an armature of a telegraph relay, said armature being connected normally to said positive terminal of said source, said armature being temporarily disconnected therefrom and connected to said negative terminal of said source; a condenser connected to said armature; a first resistor inserted between the opposite terminal of said condenser and said positive terminal of said source; a tube having a cathode, a grid, and an anode, said cathode being connected to said negative terminal of said source; a second resistor being connected between said grid and the junction of said condenser and said first resistor so as to render said tube conductive when said armature is connected to said positive terminal of said source, thereby charging said condenser through the grid-cathode space of said tube acting as a diode, and to render said tube non-conductive for a predetermined period of time determined by the magnitudes of said condenser and said resistor, when said armature is connected to said negative terminal of said source; a relay having a first and a second winding, said first winding being inserted between said anode of said tube and said positive terminal of said source, said second winding opposing said first winding and being inserted between said negative terminal of said source and the junction of said armature and said condenser, whereby, when said armature is connected to said positive terminal of said source, said tube is conductive and said first winding and said second winding thereof are energized so that said relay is not operated, whereas, when said armature is connected to said negative terminal of said source, said second winding is short-circuited and said first winding is de-energized for the predetermined period of time so that said relay is not operated, said relay being operated after the lapse of the predetermined period of time by said tube becoming conductive and energizing said first winding of said relay, said second winding being short-circuited.

6. An arrangement for clearing signalling in a telegraph system, comprising in combination, a direct potential source having a positive terminal and a negative terminal; an armature of a telegraph relay, said armature being connected normally to said positive terminal of said source, said armature being temporarily disconnected therefrom and connected to said negative terminal of said source; a condenser connected to said armature; a first resistor inserted between the opposite terminal of said condenser and said positive terminal of said source; a tube having a cathode, a grid, and an anode, said cathode being connected to said negative terminal of said source; a second resistor being connected between said grid and the junction of said condenser and said first resistor so as to render said tube conductive when said armature is connected to said positive terminal of said source, thereby charging said condenser through the grid-cathode space of said tube acting as a diode, and to render said tube non-conductive for a predetermined period of time determined by the magnitudes of said condenser and said resistor, when said armature is connected to said negative terminal of said source; a relay having a first and a second winding, said first winding being inserted between said anode of said tube and said positive terminal of said source; a contact controlled by said relay and being connected in series with said second winding between said positive terminal and said negative terminal of said source, said second winding serving as a holding winding for said relay; and a rectifier inserted between the junction of said armature and said condenser and the junction of said anode of said tube and said first winding of said relay, said rectifier short-circuiting said first winding when said armature is connected to said positive terminal of said source, whereby when said armature is connected to said positive terminal of said source said first winding and said second winding of said relay are de-energized so that said relay does not operate, whereas, when said armature is connected to said negative terminal of said source said tube is rendered non-conductive for the predetermined period of time so that said first winding and said second winding of said relay are de-energized and said relay does not operate, whereas after the lapse of the predetermined period of time said tube becomes conductive and said first winding of said relay is energized so as to operate the same, so that said contact of said relay is closed and said second winding is energized and holds said relay.

ANTONIE SNIJDERS.

References Cited in the file of this patent

UNITED STATES PATENTS

| Number | Name | Date |
| --- | --- | --- |
| 2,068,293 | Ilgenfritz | Jan. 19, 1937 |
| 2,094,733 | Byrnes | Oct. 5, 1937 |
| 2,321,618 | Potts | June 15, 1943 |

FOREIGN PATENTS

| Number | Country | Date |
| --- | --- | --- |
| 621,636 | Great Britain | Apr. 13, 1949 |